United States Patent
Achiwa

(10) Patent No.: US 7,590,671 B2
(45) Date of Patent: Sep. 15, 2009

(54) STORAGE SYSTEM, FILE MIGRATION METHOD AND COMPUTER PROGRAM PRODUCT

(75) Inventor: Kyosuke Achiwa, Yamato (JP)

(73) Assignee: Hitachi, Ltd., Tokyo (JP)

( * ) Notice: Subject to any disclaimer, the term of this patent is extended or adjusted under 35 U.S.C. 154(b) by 224 days.

(21) Appl. No.: 11/286,338

(22) Filed: Nov. 25, 2005

(65) Prior Publication Data

US 2007/0055715 A1    Mar. 8, 2007

(30) Foreign Application Priority Data

Sep. 7, 2005    (JP) .............................. 2005-259883

(51) Int. Cl.
*G06F 17/30* (2006.01)
(52) U.S. Cl. .......................... 707/204; 714/6
(58) Field of Classification Search ............ 714/6
See application file for complete search history.

(56) References Cited

U.S. PATENT DOCUMENTS

2004/0039891 A1 *    2/2004    Leung et al. ................. 711/165
2004/0193760 A1    9/2004    Matsunami et al.
2006/0212746 A1 *    9/2006    Amegadzie et al. ............ 714/6

FOREIGN PATENT DOCUMENTS

JP    2004-295457    10/2004

* cited by examiner

*Primary Examiner*—Hosain T Alam
*Assistant Examiner*—Johnese Johnson
(74) *Attorney, Agent, or Firm*—Antonelli, Terry, Stout & Kraus, LLP.

(57) ABSTRACT

A storage system including a file migration server, a file migration client, and an LDEV migration engine. The file migration client displays on a management terminal a GUI for guiding a file migration. The file migration server, upon receipt of a file migration command to migrate a part of files stored in a source logical device to a destination logical device, migrates all of the files stored in the source logical device to the destination logical device without involving a change in directory path.

15 Claims, 14 Drawing Sheets

FIG.8

LDEV-LOGICAL VOLUME CORRESPONDENCE TABLE 701

| LDEV NUMBER | LOGICAL VOLUME |
|---|---|
| 023 | /dev/vg01/lvol23 |
| 024 | /dev/vg01/lvol24 |
| ⋮ | ⋮ |

FIG.9

MOUNT TABLE 702

| LOGICAL VOLUME | DIRECTORY |
|---|---|
| /dev/vg01/lvol23 | /usr/local |
| /dev/vg01/lvol24 | /tmp/bkup |
| /dev/vg01/lvol25 | NONE |
| ⋮ | ⋮ |

FIG.10

LDEV-STORAGE TIER CORRESPONDENCE TABLE 703

| LDEV NUMBER | TIER | CAPACITY |
|---|---|---|
| 023 | FC | 4.3GB |
| 024 | FC | 4.3GB |
| ⋮ | ⋮ | ⋮ |

FIG.11

DIRECTORY-LDEV CORRESPONDENCE TABLE 704

| DIRECTORY | TIER | LDEV |
|---|---|---|
| / | FC | 022 |
| /usr | FC | 022 |
| /usr/local | FC | 023 |
| /usr/bkup | S-ATA | 138 |
| /usr/bkup/050517 | S-ATA | 138 |
| /usr/bkup/050518 | S-ATA | 138 |
| /tmp | FC | 024 |
| ⋮ | ⋮ | ⋮ |

STORAGE SYSTEM, FILE MIGRATION METHOD AND COMPUTER PROGRAM PRODUCT

CROSS-REFERENCES TO RELATED APPLICATIONS

This application relates to and claims priority from Japanese Patent Application No. 2005-295883, filed on Sep. 7, 2005, the entire disclosure of which is incorporated herein by reference.

BACKGROUND OF THE INVENTION

The present invention relates to a storage system, a file migration method, and a computer program product.

In recent years, as a storage system management method, data life cycle management (DLCM) has been gathering attention. DLCM is a concept of achieving cost-effective data management by managing data migration between storage systems in accordance with the data value changing over time. For example, an e-mail system is considered as a core system for businesses, so a high-end storage system with high performance and reliability is required. Since e-mail several weeks old decreases in access frequency, the data will be migrated from a high-end storage system to a near-line storage system. A near-line storage system, compared to a high-end storage system, is inferior in performance and reliability, but has the advantage of being low cost, and is also promptly accessible whenever needed. After one to two years have passed since the data migration to the near-line storage system, the data is moved to a tape medium to be kept in a vault. Data migration management is important in reducing data management costs according to the idea of DLCM.

In a multi-tiered storage system, the data migration operation is simplified by logically defining and categorizing storage resources as storage tiers (Tiers) in accordance with business requirements and purposes. For example, when old e-mail data is moved to a low-cost storage system, a storage tier is logically defined under the name of an arbitrary name such as "low-cost storage" or "e-mail data storage," making it possible to easily search optimum storage resources using that storage tier definition in conducting a data migration.

Also, for enhancing the convenience of data migration management, file-based data migration is getting more attention recently, in addition to block-based data migration. For example, JP-A-2004-295457 refers to a technique of file-based data migration conducted between disks of different tiers.

SUMMARY OF THE INVENTION

When a file is moved between storage tiers, for the convenience of file management, it is preferable that its directory path (absolute path) does not change.

However, if a file is moved using the UNIX® mv command or the like, its directory path changes, making it impossible to change only the storage tier in which the file is stored without changing the directory path.

Furthermore, this type of data migration uses a command (such as the mv command) implemented above a file system, and therefore, consumes processor resources of a NAS (Network Attached Storage) server, making it impossible for the NAS server to provide sufficient processor resources to perform its primary processing, for example, responding to a file access request from a NAS client.

An object of the present invention is to provide a highly-convenient file migration environment that resolves the aforementioned problems. Another object of the present invention will be clarified from the descriptions in the embodiment described later.

In order to achieve the above objects, the storage system of the present invention includes: a plurality of physical devices providing a plurality of logical devices for storing one or more files; a file system for managing the files stored in the logical devices with a directory tree structure; a file migration server for controlling migration of the files stored in the logical devices; a file migration client for displaying a GUI for guiding file migration, and conveying an administrator's file migration command to the file migration server; and first file migration means for migrating all files stored in a source logical device selected from the logical devices by the administrator to a destination logical device selected from the logical devices by the administrator, without a change in directory path for any of the files. Upon a file migration command to migrate a part of the files stored in the source logical device to the destination logical device being input to the file migration client via the GUI, the file migration server controls the first file migration means to migrate all of the files stored in the source logical device to the destination logical device. Using the first file migration means to execute file migration makes it possible to achieve file-based file migration without a change in directory path.

The storage system according to the present invention may further include second file migration means for executing file migration involving a change in directory path, and third file migration means for creating a new file system containing a file to be moved, and mounting the file system on the source directory. In addition to the first file migration means as a block-based file migration means not involving a change in directory path, the second file migration means as a file-based file migration means involving a change in directory path, or the third file migration means as a file-based file migration means not involving a change in directory path may arbitrarily be used, thereby making it possible to provide a highly-convenient file migration environment.

Preferably, the GUI that provides a file migration operating environment includes, for example, a screen for displaying, in relation to each other, the directory paths of files and the storage tiers to which the physical devices storing the files belong, making it possible to provide an operating environment in which an operation for moving a file between storage tiers can be easily conducted visually.

Preferably, the GUI includes a screen for displaying a list of the other files stored in the logical device storing a file designated as a file move target. File migration by the first file migration means migrating all the files stored in the source logical device to the destination logical device, so it is preferable to request confirmation from the administrator in advance.

Preferably, the GUI also includes a screen for requesting selection of which of the first file migration means, the second file migration means, and the third file migration means is to be used for file migration, making it possible to provide a highly-convenient operating environment.

Preferably, the GUI includes a screen for, subject to any of the first file migration means, the second file migration means, and the third file migration means having been selected as the file migration means, displaying a list of one or more storage tiers to which one or more candidate destination physical devices for the file, from among the physical devices, belong, making it possible to provide an operating environment in which the operation for moving a file between storage tiers can be easily conducted visually.

Preferably, the GUI also includes a screen for, subject to any storage tier from among the list of storage tiers having been selected after the selection of either of the first file migration means or the third file migration means as the file migration means, displaying a list of one or more "free" logical devices belonging to the selected storage tier, making it possible for easy selection of the destination logical device.

Preferably, the GUI also includes a screen for, subject to any storage tier from among the list of storage tiers having been selected after the selection of the second file migration means as the file migration means, displaying a list of one or more directory paths belonging to the selected tier, making it possible for easy selection of the destination directory.

The present invention makes it possible to provide a highly-convenient file migration environment.

BRIEF DESCRIPTION OF THE DRAWINGS

FIG. 8 is a diagram for explaining an LDEV-logical volume correspondence table.

FIG. 9 is a diagram for explaining a mount table.

FIG. 10 is a diagram for explaining an LDEV-storage tier correspondence table.

FIG. 11 is a diagram for explaining a directory-LDEV correspondence table.

DETAILED DESCRIPTION OF THE PREFERRED EMBODIMENTS

Hereinafter, an embodiment of the present invention is explained with reference to each of the drawings.

Figure 1:
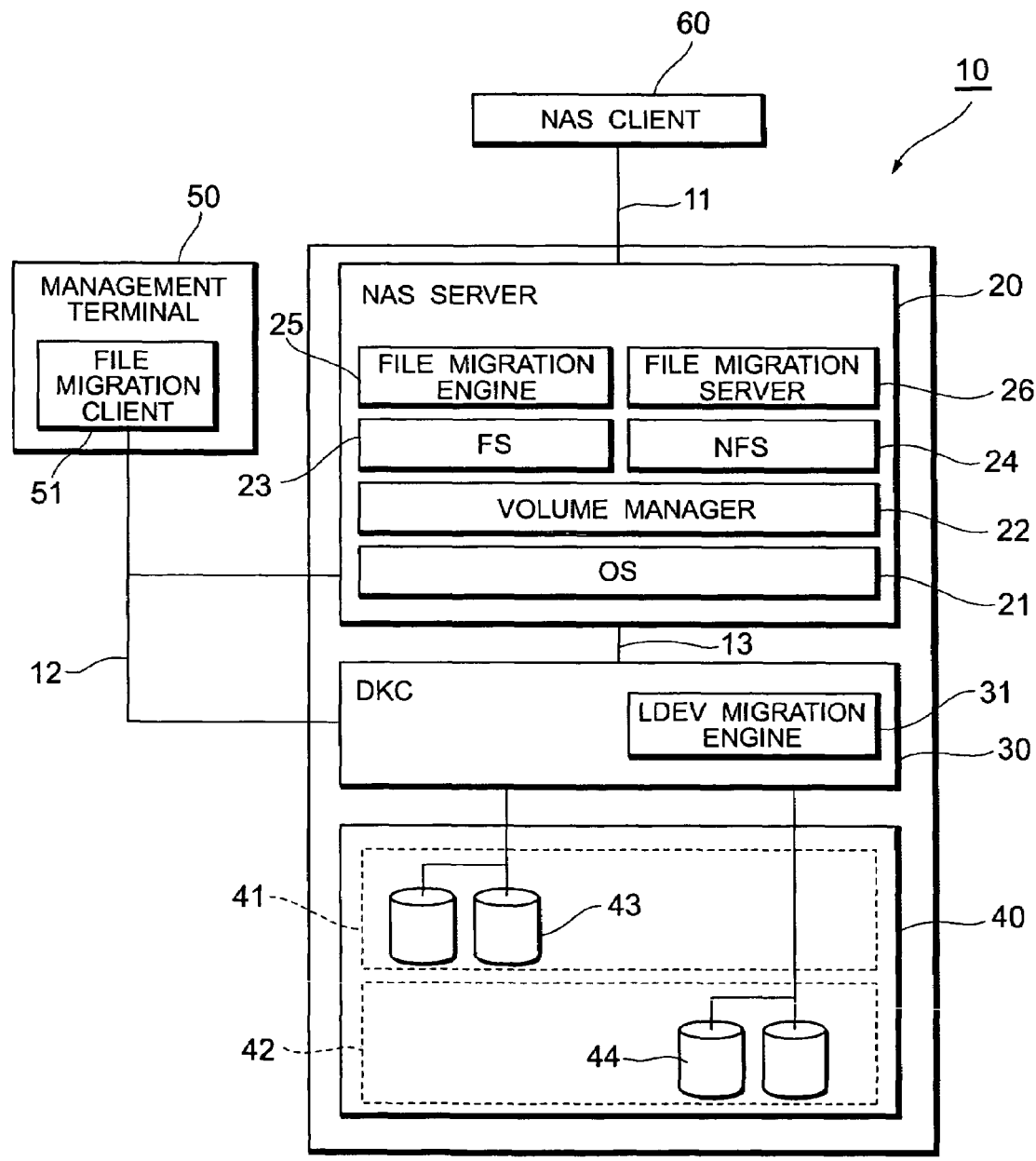
FIG. 1 is a system configuration of a storage system according to an embodiment of the present invention.

FIG. 1 shows a system configuration of a storage system 10 according to an embodiment of the present invention. The storage system 10 includes a NAS server 20, and a storage controller (DKC) 30, and a storage apparatus 40. The NAS server 20 is connected to a NAS client 60 via a data communication network 11, and also to a management terminal 50 via a management network 12. The storage controller 30 is connected to the management terminal 50 via the management network 12, and also to the NAS server 20 via an internal network 13.

For the data communication network 11, a LAN (Local Area Network) or other IP (Internet Protocol) network that performs data transmission according to TCP/IP (Transmission Control Protocol/Internet Protocol) can be used.

The NAS client 60 sends a file access request to the storage system 10 according to a network file system protocol such as NFS (Network File System) or CIFS (Common Interface File System). The NAS client 60 may be, for example, a personal computer, a work station, a mainframe computer, and may also be a Windows®-based system, or a UNIX®-based system. The NAS client 60 has, for example, Web application software, streaming application software, and e-business application software installed therein.

The NAS server 20, which functions as an adapter for controlling data input/output between the NAS client 60 and the storage controller 30, receives file access requests transmitted from the NAS client 60, and transmits I/O requests according to the file access requests to the storage controller 30. The I/O requests include an access type for distinguishing between write access or read access, or others. For example, the NAS server 20, upon receipt of a write access request from the NAS client 60, transmits an I/O request including the write data transmitted from the NAS client 60 and the access type to the storage controller 30. Also, the NAS server 20, upon receipt of a read access request from the NAS client 60, transmits an I/O request including the access type to the storage controller 30, and transmits in files the read data obtained from the storage controller 30 to the NAS client 60.

The NAS server 20 includes an operating system (OS) 21, a volume manager 22, a file system (FS) 23, a network file system (NFS) 24, a file migration engine 25, and a file migration server 26.

The volume manager 22 manages storage resources (such as physical volumes, volume groups, and logical volumes). The file system 23 manages files using a directory tree structure. The network file system 24 provides a file sharing service by making the file system 23 in the NAS server 20 mountable in the NAS client 60 as its file system. The file migration engine 25 is a program for controlling file-based data migration. For example, the UNIX® mv command functions as the file migration engine 25. File migration according to the file migration engine 25 involves a change in directory path. The file migration server 26 is a program for controlling file migration between storage tiers. For example, the file migration server 26 can arbitrarily use the file migration engine 25 or an LDEV migration engine 31 according to administrator file migration commands, and also create a GUI (Graphical User Interface) for an administrator to direct a file migration. The details of the file migration server 26 are described later.

The storage controller 30 controls data writing/reading to/from the storage apparatus 40. The storage controller 30 includes the LDEV migration engine 31. The LDEV migration engine 31 copies all data (including all files) stored in a source logical device to a destination logical device at the SCSI (Small Computer System Interface) block level, and interchanges the LDEV number for the source device, with that for the destination device. For example, the LDEV number for a logical device A created in FC (Fibre Channel) disk drives is made "1," and the LDEV number for a logical device B created in SATA (Serial Advanced Technology Attachment) disk drives is made "2." Upon performing file migration from the source logical device A to the destination logical device B using the LDEV migration engine 31, all the files stored in the logical device A are copied to the logical device B, and then, the LDEV number for the logical device A is changed to be "2," and that for the logical device B is changed to be "1." From the viewpoint of the NAS client 60, there is no change in the directory tree structure of the logical device with the LDEV number "1," and thus, file migration using the LDEV migration engine 31 does not involve a change in directory path.

Furthermore, file migration using the LDEV migration engine 31 makes it possible to only change physical devices, which form the basis for a logical device, (e.g., a change from FC disks to SATA disks) without changing the directory tree structure of the logical device, which is preferable for file migration between storage tiers.

In addition, when there is a write access from the NAS client 60 to a source logical device during a file copy from the source logical device to its destination logical device, the storage controller 30 can respond to the write access from the NAS client 60 by writing the data to both the source and destination logical devices. When there is a read access from the NAS client 60 during a file copy from the source logical device to its destination logical device, the storage controller 30 can respond to the read access from the NAS client 60 by sending in reply just data read from the source logical device to the NAS client 60.

However, the destination logical device cannot accept an I/O request from the NAS client 60, and thus, it is required to designate a "free" logical device, one not assigned to the NAS client 60, as the destination device.

The storage apparatus 40 includes a plurality of storage tiers 41 and 42. A storage tier can be defined by arbitrarily grouping physical devices. For example, a storage tier 41 can be defined as a highly-reliable FC tier. The FC tier, for example, can be defined by a group of physical devices consisting of a plurality of FC disk drives 43 with RAID1. Another storage tier 42, for example, can be defined as a low-cost SATA tier. The SATA tier, for example, can be defined by a group of physical devices consisting of a plurality of SATA disk drives 44 with RAID5.

The definition of a storage tier is not limited to the aforementioned examples, and storage tiers can also be classified according to the disk drive specifications. For example, storage tiers may be divided between high-performance FC disk drives, and low-performance FC disk drives, or may also be divided between FC disk drives with a large storage capacity, and FC disk drives with a small storage capacity. Furthermore, the storage tiers may be divided according to physical device type (e.g., hard disk drive, flexible disk drive, magnetic tape drive, semiconductor memory drive, optical memory drive, etc.).

The management terminal 50 displays a GUI to assist an administrator during a file migration. The management terminal 50 is a console including a display and an input device (such as a keyboard or mouse). The management terminal 50 includes a file migration client 51. The file migration client 51 is a program for displaying a file migration instruction GUI on the management terminal 50. When file migration instructions are input from an administrator via the GUI, the file migration client 51 conveys the file migration instructions to the file migration server 26.

Figure 2:
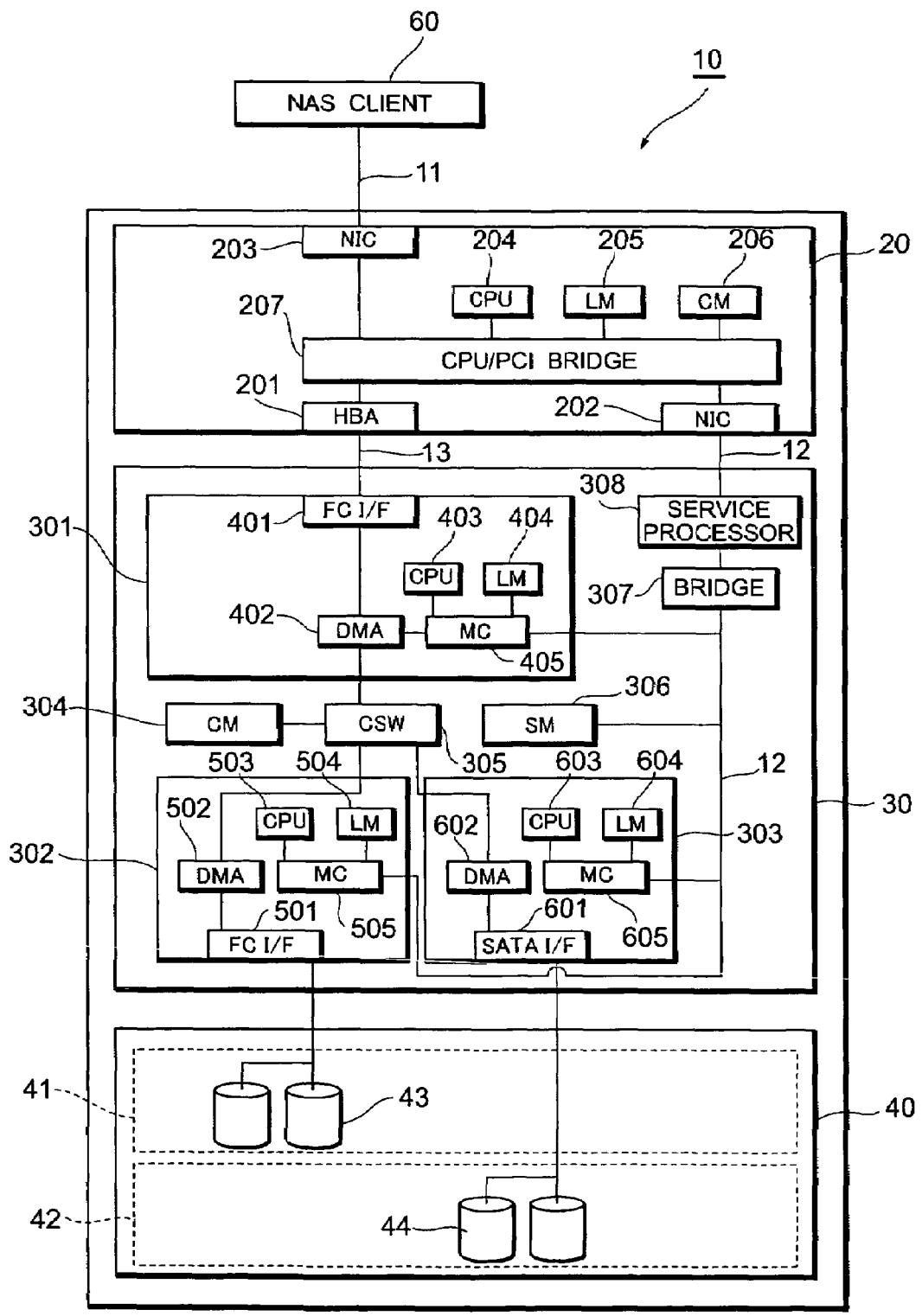
FIG. 2 is a diagram showing the detailed configuration of the storage system according to an embodiment of the present invention.

FIG. 2 is the detailed configuration of the storage system 10 according to this embodiment. The NAS server 20 includes a host bus adapter (HBA) 201, network interface cards (NIC) 202 and 203, a CPU 204, local memory (LM) 205, cache memory (CM) 206, and a CPU/PCI bridge 207.

The host bus adapter 201, and the network interface cards 202 and 203 are connected to a channel adapter 301, a service processor 308, and the NAS client 60 respectively. The CPU 204 processes file access requests from the NAS client 60. The local memory 205 stores management information for managing files stored in the storage apparatus 40. The cache memory 206 temporarily stores data sent/received between the NAS client 60 and the storage apparatus 40. The CPU/PCI bridge 207 connects the host bus adapter 201, the network interface cards 202 and 203, the CPU 204, the local memory 205, and the cache memory 206.

The CPU 204, upon receipt from the NAS client 60 of a file access request designating a file name, creates, based on the management information stored in the logical memory 205, an I/O request with blocks, being units of data management in the storage apparatus 40, as units, and stores that request in the cache memory 206. If the file access request is a write access request, the write data received from the NAS client 60 is also stored in the cache memory 206. The CPU 204 notifies the storage controller 30 of the I/O request. When the storage controller 30 responds to that notification, the CPU 204 reads the file access request stored in the cache memory 206 (including the write data in the case of a write access request), and sends it to the storage controller 30.

The storage controller 30 includes a channel adapter (CHA) 301, a disk adapter (DKF) 302, a disk adapter (DKS) 303, cache memory (CM) 304, a crossbar switch (CSW) 305, shared memory (SM) 306, a bridge 307, and a service processor 308.

The channel adapter 301 controls data communication with the NAS server 20.

The disk adapter 302 controls data writing/reading between the cache memory 304, and FC disk drives 43 belonging to the storage tier 41. The storage adapter 302, upon writing/reading data to/from the FC disk drives 43, converts a logical address into a physical address. If the FC disk drives 43 are controlled by a RAID configuration, the disk adapter 302 performs data access according to the RAID configuration. For example, the disk adapter 302 writes the same data respectively to separate FC disk drives, or executes a parity computation to write the data and parity data to a group of FC disk drives.

The disk adapter 303 controls data writing/reading between the cache memory 304 and SATA disk drives 44 belonging to the storage tier 42. The detailed description of the function of the disk adapter 303 is omitted, as it is the same as that of the disk adapter 302.

The cache memory 304 temporarily stores data received from the NAS client 60 or data read from the storage apparatus 40.

The shared memory 306 stores configuration information on the storage system 10, and also is used for delivering I/O commands received by the channel adapter 301 from the NAS server 20 to the disk adapter 302 or 303. The crossbar switch 305 interconnects the channel adapter 301, the disk adapter 302, the disk adapter 303, and the cache memory 304.

The service processor 308 is a console for maintaining the storage system 10. The administrator uses the service processor to, for example, configure the setting of a logical device defined in FC disk drives 43 or SATA disk drives 44, add or delete an FC disk drive 43 or a SATA disk drive 44, and change RAID configuration settings (for example, change RAID level 5 to RAID level 1).

The bridge 307 connects the service processor 308 to a management bus 12 that connects the channel adapter 301, the disk adapter 302, the disk adapter 303, and the shared memory 306.

The channel adapter 301 includes an FC interface 401, a DMA transfer circuit 402, a CPU 403, memory (LM) 404, and a memory controller (MC) 405.

The FC interface 401 performs data communication with the NAS server 20 according to Fibre Channel Protocol. The DMA transfer circuit 402, upon a command from the CPU 403, performs a DMA transfer of data received from the NAS client 60 to the cache memory 304, or a DMA transfer of data stored in the cache memory 304 to the NAS client 60. The CPU 403, which operates based on channel adapter firmware installed in the memory 404, sends/receives data to/from the DMA transfer circuit 402 or the FC interface 401 via the memory controller 405.

The disk adapter 302 includes an FC interface 501, a DMA transfer circuit 502, a CPU 503, memory (LM) 504, and a memory controller (MC) 505.

The FC interface 501 performs data communication with the FC disk drives 43 according to Fibre Channel Protocol. The DMA transfer circuit 502, upon a command from the CPU 503, performs a DMA transfer of data read from the FC disk drives 43 to the cache memory 304, or performs a DMA transfer of data stored in the cache memory 304 to the FC disk drives 43. The CPU 503, which operates based on disk adapter firmware installed in the memory 504, sends/receives data to/from the DMA transfer circuit 502 or the FC interface 501 via the memory controller 505.

The disk adapter 303 includes a SATA interface 601, a DMA transfer circuit 602, a CPU 603, memory (LM) 604, and a memory controller (MC) 605.

The SATA interface 601 performs data communication with the SATA disk drives 44 according to SATA Protocol. The DMA transfer circuit 602, upon a command from the CPU 603, performs a DMA transfer of data read from the SATA disk drives 44 to the cache memory 304, or performs a DMA transfer of data stored in the cache memory 304 to the SATA disk drives 44. The CPU 603, which operates based on disk adapter firmware installed in the memory 604, sends/receives data to/from the DMA transfer circuit 602 or the SATA interface 601 via the memory controller 605.

Figure 3:
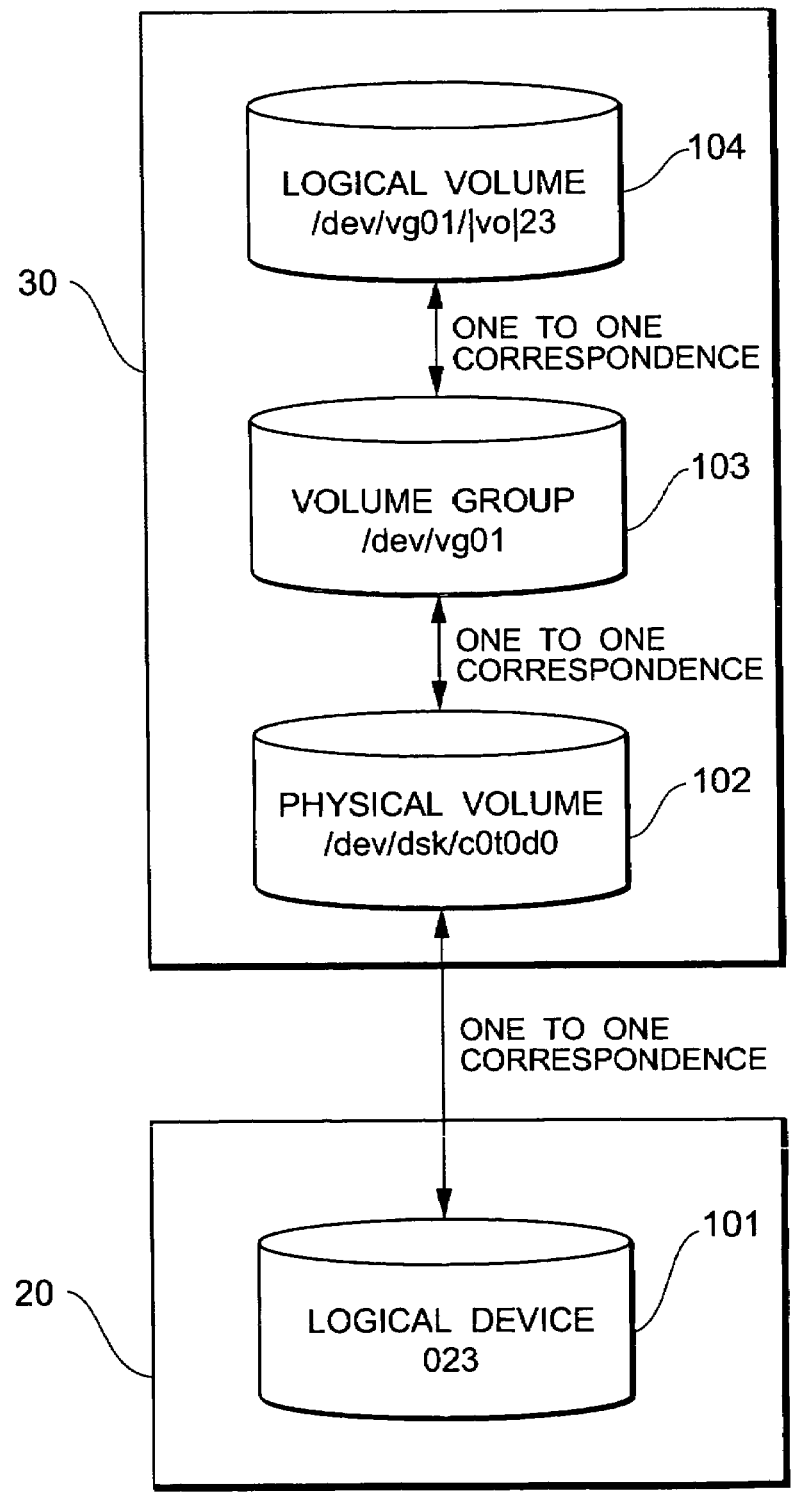
FIG. 3 is an explanatory diagram showing the correspondence relationship between a logical device, a physical volume, a volume group, and a logical volume.

Next, the correspondence relationship between a logical device 101, a physical volume 102, a volume group 103, and a logical volume 104 is explained below with reference to FIG. 3.

The NAS server 30 recognizes the logical device 101 as one physical device, and accesses the logical device 101 by designating the logical device using a LUN (Logical Unit Number), and designating an access position in the logical device using a logical block address (LBA). The physical volume 102 is the logical device 101 from the viewpoint of the NAS server 30, and the physical volume 102 and the logical volume 101 correspond one to one to each other. The volume group 103 consists of several physical volumes 102. The logical volume 104 consists of a storage area as a result of the volume group 103 being divided in physical extents, or the entire storage area of the volume group 103.

In this embodiment, in order to simplify the subsequent explanation, one volume group 103 is assumed to be created from one physical volume 102. Furthermore, one logical volume 104 is assumed to be created from one volume group 103. In other words, the logical volume 104 corresponds to the logical device 101 one to one. However, that correspondence is just for ease of explanation, and the present invention is not limited to the above case. The aforementioned file system 23 is created in the logical volume 104. The network file system 24 is assumed to provide the directory tree structure of the file system 23 to the NAS client 60 as it is.

Next, with reference to FIGS. 4 to 7, a brief description of file migration control between storage tiers, and an explanation of GUI screen shifting are provided below.

Figure 4:
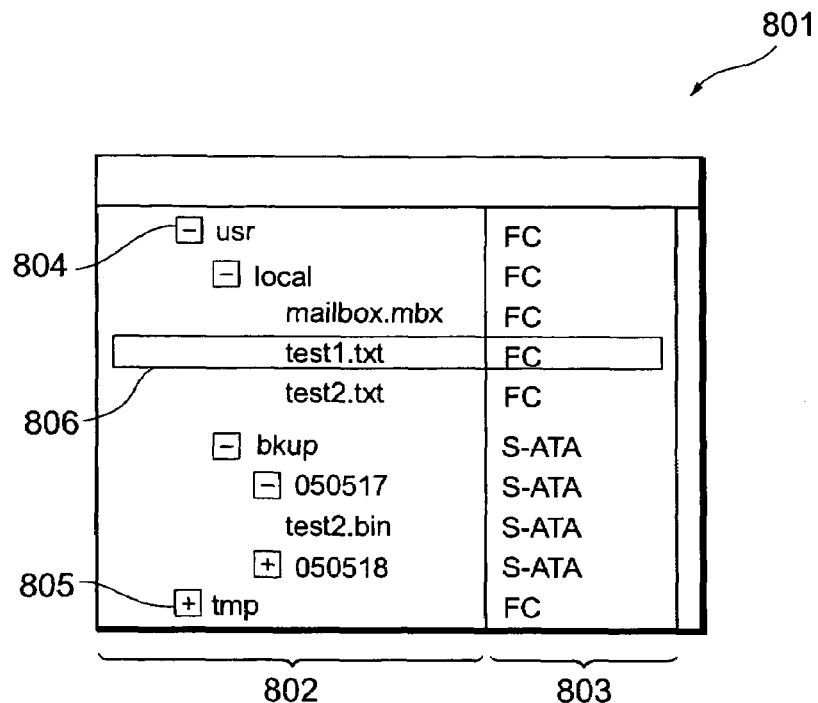
FIG. 4 shows an example display for a move target selection window.

FIG. 4 shows a move target selection window 801. The window 801 is created by the file migration server 26, and displayed on the display of the management terminal 50. The window 801 includes a window for displaying a list of directory files (or directory paths), i.e., a directory file display window 802, a window for displaying a list of storage tiers in which directory files are stored, i.e., a storage tier display window 803. The storage tier display window 803 displays storage tiers in which the directory files displayed in the directory file display window 802 are stored, in relation to those directory files.

For example, according to the example shown in FIG. 4, /usr belongs to the FC tier, /usr/local belongs to the FC tier, the tier of and below /usr/bkup belongs to the SATA tier, and /tmp belongs to the FC tier.

In the directory file display window 802, an icon 804 indicates that the directory display is extended, and also, an icon 805 indicates that the directory display is not extended. The cursor 806 moves within the move target selection window 801 in accordance with the mouse movements. The administrator, referring to the window 801, can point the cursor 806 to a file or directory targeted for file migration to direct file migration between storage tiers.

Figure 5:
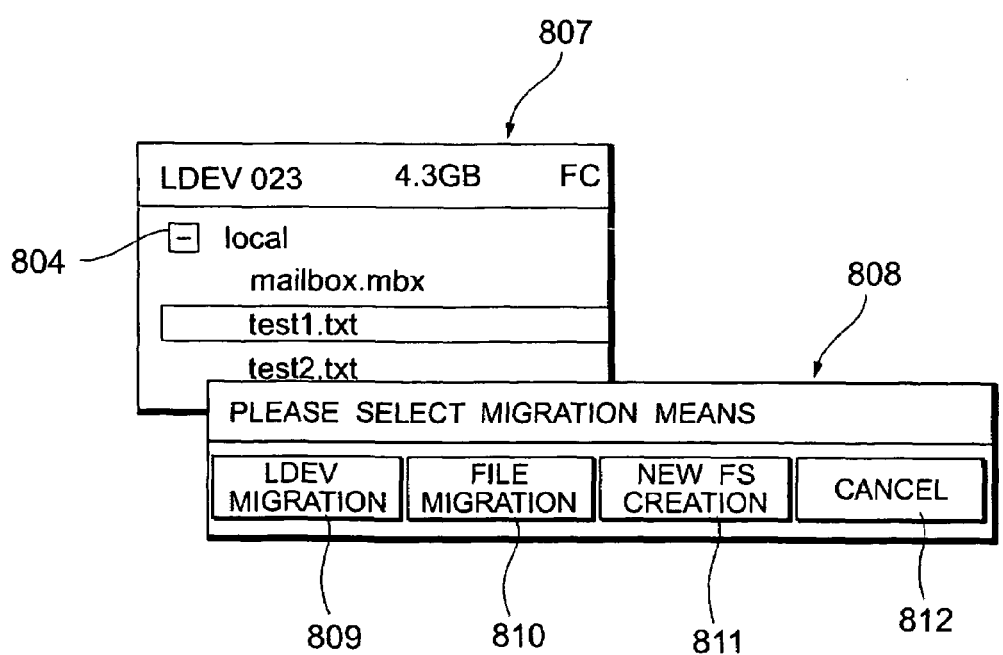
FIG. 5 shows example displays for an LDEV file list display window, and a migration means selection dialogue.

FIG. 5 shows a LDEV file list display window 807 and a migration means selection dialogue 808. When a file migration is directed through the move target selection window 801 shown in FIG. 4, the GUI displayed on the management terminal 50 shifts from the screen display shown in FIG. 4 to that shown in FIG. 5. The LDEV file list display window 807 displays a list of all other files stored in the logical device storing the file designated as a move target. The LDEV file list display window 807 also displays the LDEV number, storage capacity and storage tier for the logical device storing the file designated as the move target.

The migration means selection dialogue 808 displays a plurality of buttons 809, 810, 811, and 812 representing the different kinds of file migration means. The button 809 is used to direct file migration using the LDEV migration engine 31. When file migration is conducted using the LDEV migration engine 31, not only the file designated as a move target, but also the other files stored in the logical device storing that file (i.e., all the files displayed on the LDEV file list display window 807) will be migrated.

Thus, displaying the list of all other files stored in the logical device storing the file designated as a move target in the LDEV file list display window 807 also means that, if the LDEV migration engine 31 is used as a file migration means, approval for all files displayed on the LDEV file list display window 807 (files for which file migration is not directly ordered) being migrated is requested.

The button 810 is used to direct file migration according to the file migration engine 25. Using the file migration engine 25, file-based file migration is possible.

The button 811 is used to direct file migration involving new file system creation. The file migration engine 25 is used for file migrations involving new file system creation. The file migration engine 25 creates a new file system only containing the file designated as the move target in a free logical device, and mounts that file system in the source directory. As a result, updating of a mount table 702 is required. The updating of the mount table 702 is conducted by the file migration server 26.

In this specification, file migration according to the LDEV migration engine 31 may be referred to as a first file migration means, that according to the file migration engine 25 may be referred to as a second file migration means, and that involving a new FS creation may be referred to as a third file migration means. File migration by the first migration means or the third file migration means does not involve a change in directory path. File migration by the second file migration means involves a change in directory path.

The GUI display is not limited to the above example, and may be changed arbitrarily. For example, when file migration is ordered for a certain percentage (e.g. 80%) or more of the files stored in a logical device, a recommendation for an "LDEV migration" may be displayed. Furthermore, if some logical devices from among a plurality of logical devices belonging to a RAID group have a heavy I/O load, the performance of the other logical devices belonging to that RAID group will deteriorate. Therefore, a recommendation for LDEV migration to another RAID group may be displayed.

Figure 6:
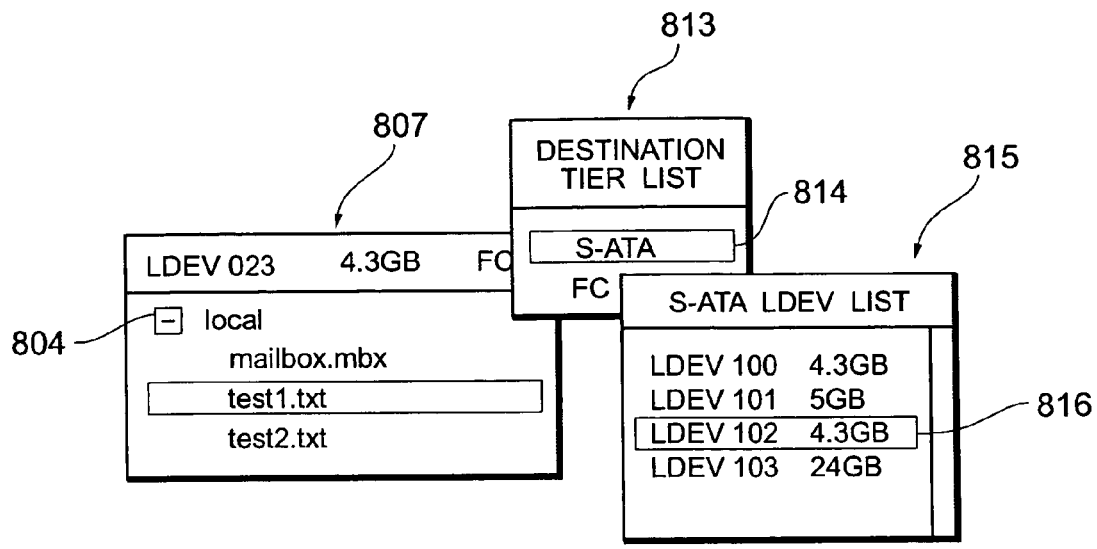
FIG. 6 shows example displays for an LDEV file list display window, a destination tier selection window, and a tier-classified LDEV list display window.

FIG. 6 shows the LDEV file list display window 807, a destination tier selection window 813, and a tier-classified LDEV list display window 815. When the "LDEV migration (first file migration means)" or the "new FS creation (third file migration means)" is selected from the migration means selection dialogue 808 shown in FIG. 5, the GUI displayed on the management terminal 50 shifts from the screen display shown in FIG. 5 to that shown in FIG. 6, and displays the destination tier selection window 813. The window 813 displays a list of the destination storage tiers. In this embodiment, for ease of explanation, the FC tier and the SATA tier are defined as storage tiers, so the window 813 displays those two kinds of tiers of the FC tier and the SATA tier. A cursor 814 moves within the destination tier selection window 813 in accordance with the mouse movements. The administrator, referring to the window 813, points the cursor 814 to the destination storage tier to select the destination storage tier.

When any storage tier is selected from the window 813, a list of "free" logical devices belonging to the selected storage tier is displayed in the tier-classified LDEV list display window 815. The window 814 also displays the storage capacity of each "free" logical device. The cursor 816 moves within the tier-classified LDEV list display window 815 in accordance with the mouse movements. The administrator, referring to the window 815, points the cursor 816 to the destination logical device to select the destination logical device.

Figure 7:
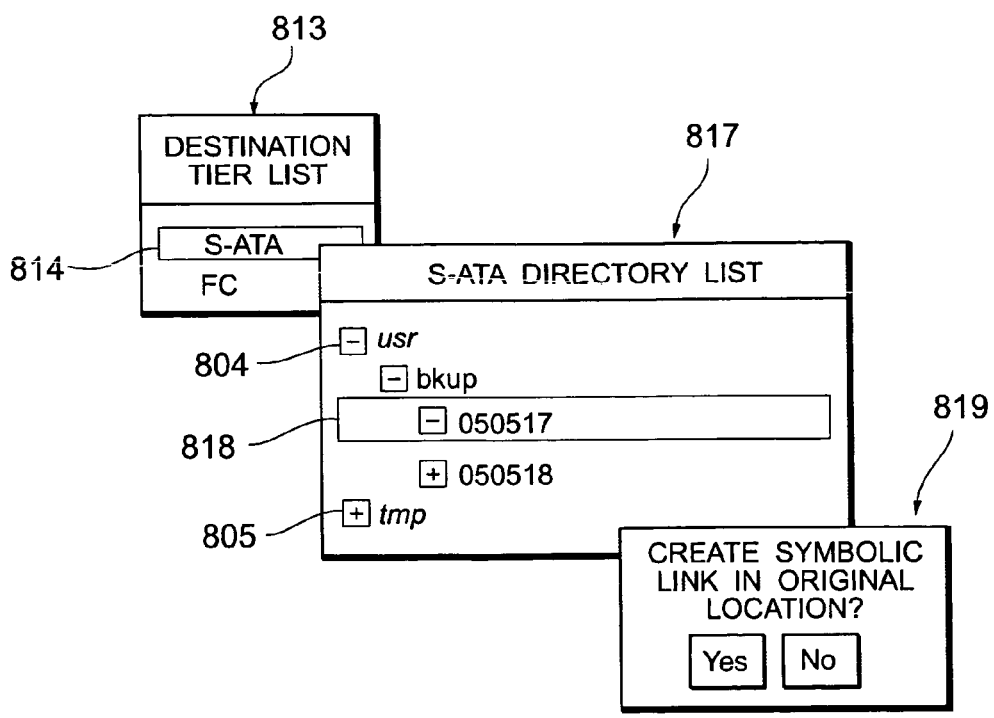
FIG. 7 shows example displays for a destination tier selection window, a tier-classified directory list display window, and a symbolic link creation dialogue.

FIG. 7 shows the destination tier selection window 813, the tier-classified directory list display window 817, and a symbolic link creation dialogue 819. When the "file migration (second file migration)" is selected from the migration means selection dialogue 808 shown in FIG. 5, the GUI displayed on the management terminal 50 shifts from the screen display shown in FIG. 5 to that shown in FIG. 7, and displays the destination tier selection window 813. When any storage tier is selected from the window 813, directories belonging to the selected storage tier and their subdirectories are displayed in a tree layout in the tier-classified directory list display window 817.

In the window 817, the directories in italics are those that cannot be selected as a destination directory. For example, /usr belongs to the FC tier, but its subdirectory of /usr/bkup belongs to the SATA tier, so it is necessary for the sake of convenience to display /usr to correctly display the directory path of /usr/bkup. However, only the directories belonging to the selected storage tier may also be displayed on the window 817. The cursor 818 moves within the window 817 in accordance with the mouse movements. The administrator, referring to the window 817, points the cursor 818 to the destination directory to select it.

Upon the completion of the file migration, the symbolic link creation dialogue 819 is displayed. The administrator can create a symbolic link for the source directory path for the file after the migration by selecting "YES" from the dialogue 819.

Next, various tables necessary for file migration control between storage tiers and the processing for preparing those tables are explained below with reference to FIGS. 8 to 14.

FIG. 8 shows the LDEV-logical volume correspondence table 701. The table 701 is a table indicating the correspondence relationships between logical devices and logical volumes. The file migration server 26 manages the table 701.

Figure 12:
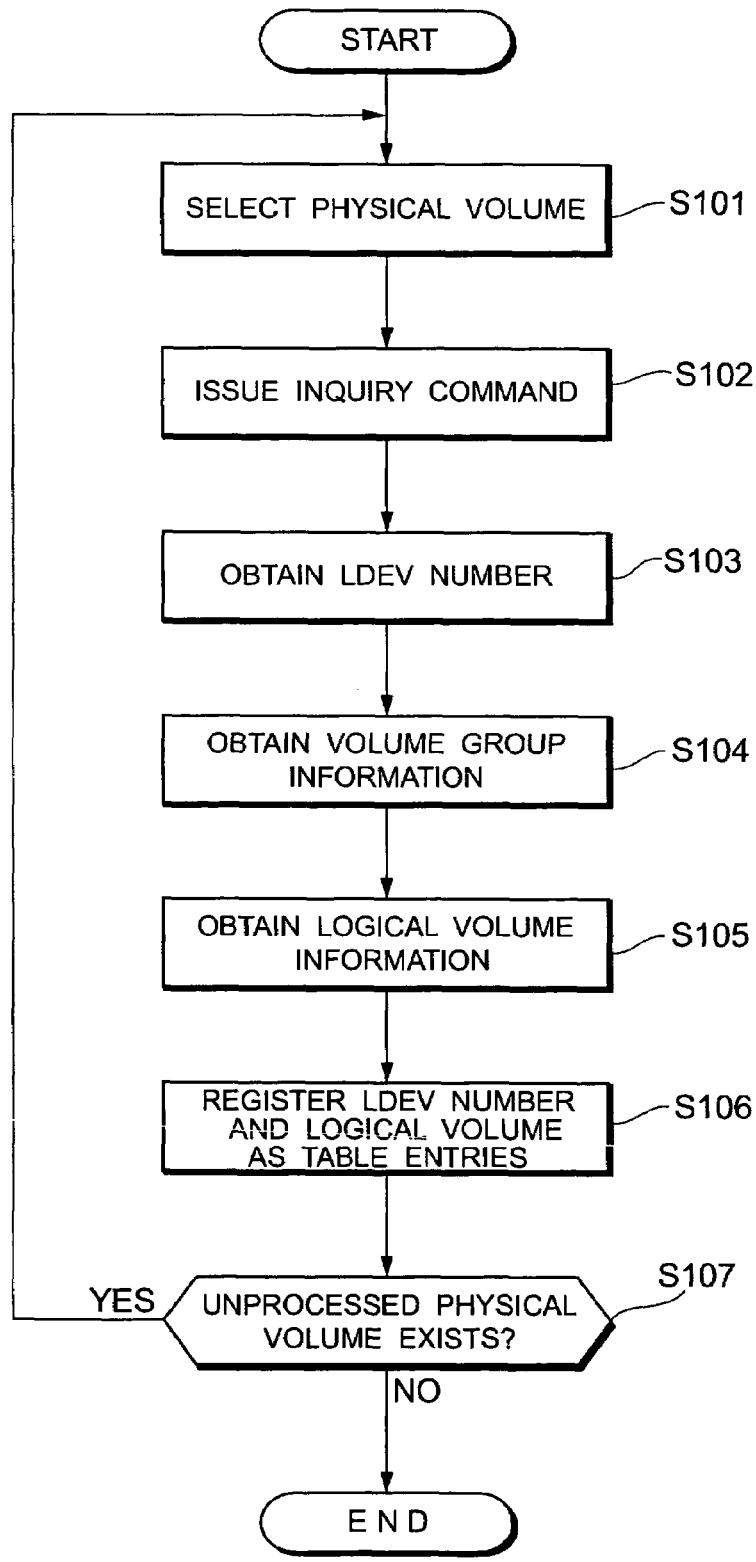
FIG. 12 shows a flowchart for processing to prepare a LDEV-logical volume correspondence table.

FIG. 12 is a flowchart showing the processing for preparing the LDEV-logical volume correspondence table 701. The processing for preparing the table 701 is explained below with reference to FIG. 12. The file migration server 26 selects a physical volume (S101), and issues an inquiry command to the selected physical volume (S102). The details of that inquiry command are specified by SCSI Protocol, and the return value of the inquiry command includes the LDEV number for the physical volume. The file migration server 26 receives the return value from the physical volume, thereby obtaining the LDEV number for the physical volume (S103).

Next, the file migration server 26, using a management command (e.g., vgdisplay) supported by the volume manager 22, obtains information for a volume group corresponding to the physical volume (S104), and obtains information for a logical volume corresponding to the volume group (S105). The file migration server 26 stores the LDEV number obtained at S103 and the logical volume information obtained at S105 as entries in the LDEV-logical volume correspondence table 701 (S106).

If any physical volume on which the above processing has not been performed still exists (S107: YES), the processing at S101 to S106 is repeated, and when the above processing has been completed for all physical volumes (S107: NO), the file migration server 26 ends the processing for preparing the table 701.

FIG. 9 shows a mount table 702. The table 702 indicates in which directory each logical volume is mounted. "NONE" is registered as the table entry for the directory of any "free" logical volume not mounted in a directory tree. A directory in which a logical volume is mounted can be referred to using a command (e.g., ls) supported by the operating system 21. The file migration server 26 manages the table 702.

FIG. 10 shows a LDEV-storage tier correspondence table 703. The table 703 is a table indicating the respective correspondence relationships of logical devices, the storage tiers to which the logical devices belong, and the storage capacities of those logical devices. The file migration server 26 manages the table 703.

Figure 13:
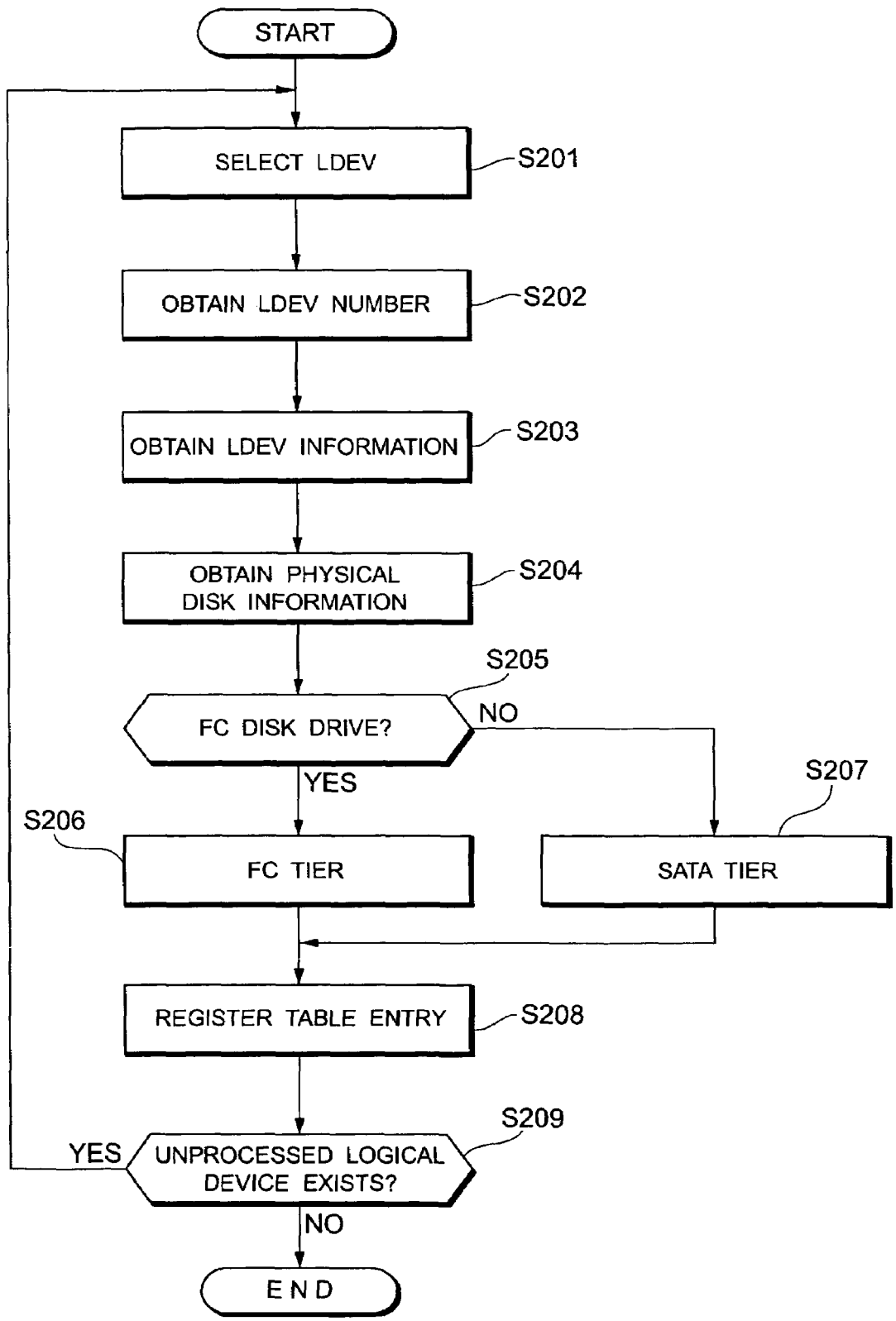
FIG. 13 shows a flowchart for processing to prepare a LDEV-storage tier correspondence table.

FIG. 13 is a flowchart showing the processing for preparing the LDEV-storage tier correspondence table 703. The processing for preparing the table 703 is explained below with reference to FIG. 13. The file migration server 26 selects a logical device (S201), and sends to the service processor 308 a management command to request configuration information stored in the shared memory 306. The service processor 308, upon receipt of the management command from the file migration server 26, obtains via the bridge 307 the necessary information from the configuration information in the shared memory 306, and sends it back to the file migration server 26. Then, the file migration server 26 obtains the LDEV number and size for the logical device, the numbers for the physical disks corresponding to the logical device, and information on those physical disks (storage tier) (S202, S203 and S204).

Next, the file migration server 26 judges whether or not the physical disks are FC disk drives (S205). In this embodiment, for ease of explanation, physical disks belong to either of the FC tier or the SATA tier. If the physical disks are FC disk drives (S205: YES), the physical disks are judged as belonging to the FC tier (S206), and the LDEV number, the storage tier and the storage capacity are stored as FC tier table entries in the LDEV-storage tier correspondence table 703 (S208).

Meanwhile, if the physical disks are not FC disk drives (S205: NO), the physical disks are judged as belonging to the SATA tier (S207), and the LDEV number, the storage tier and the storage capacity are stored as SATA tier table entries in the LDEV-storage tier correspondence table 703 (S208).

If any logical device on which the above processing has not been performed exists (S209: YES), the file migration server 26 repeats the processing at S201 to S208, and when the above processing has been completed for all logical devices (S209: NO), the file migration server 26 ends the processing for preparing the table 703.

FIG. 11 shows the directory-LDEV correspondence table 704. The table 704 indicates which logical device each directory is stored in and which storage tier each logical device belongs to. The file migration server 26 manages the table 704.

Figure 14:
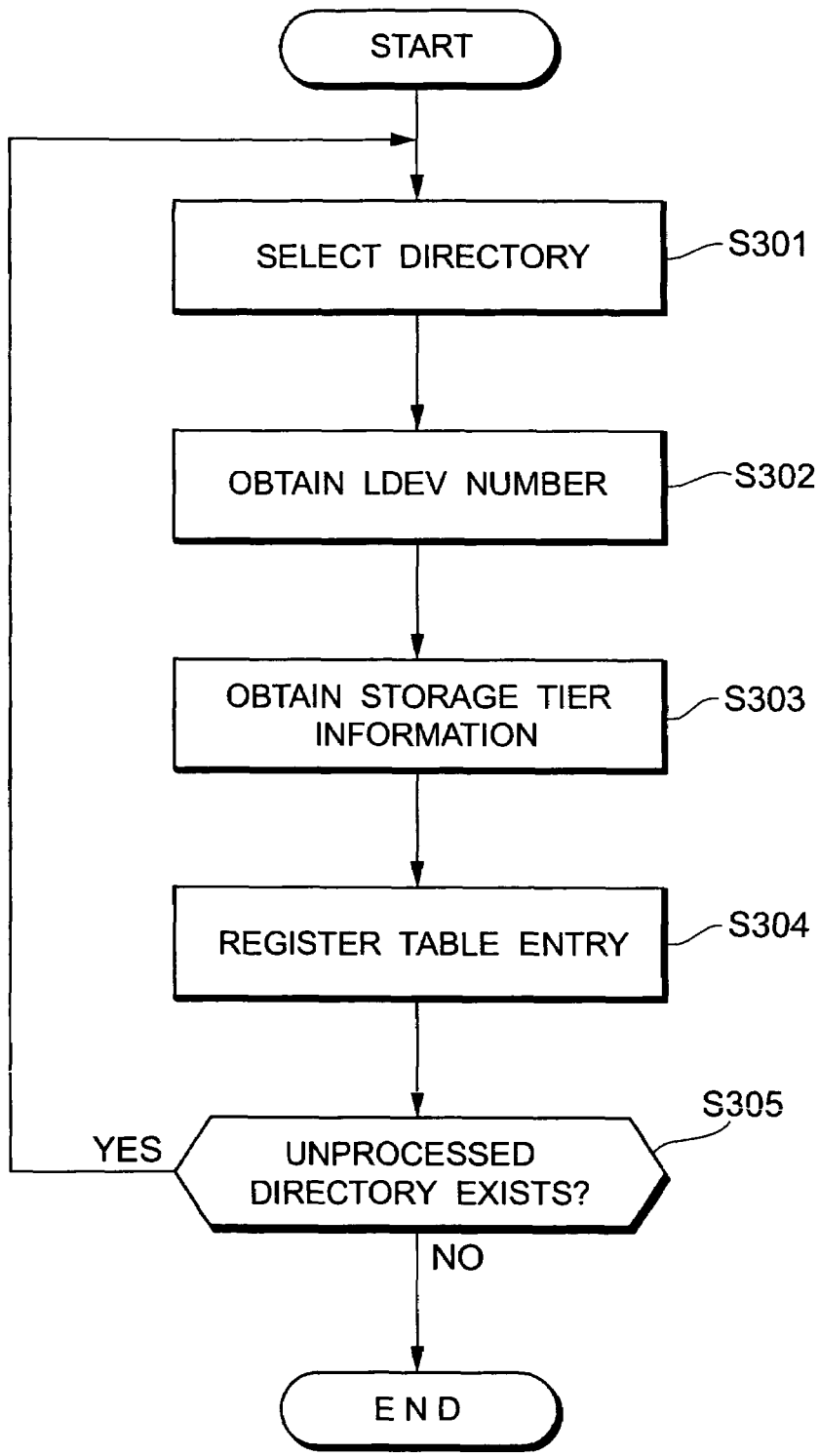
FIG. 14 shows a flowchart for processing to prepare a directory-LDEV correspondence table.

FIG. 14 shows a flowchart indicating the processing for preparing the directory-LDEV correspondence table 704. The processing for preparing the table 704 is explained below with reference to FIG. 14. The file migration server 26, starting from the route directory 26, selects the successive lower directories in order (S301), and obtains the LDEV numbers for the logical devices corresponding to each logical volume mounted in the selected directories with reference to the mount table 702 and the LDEV-logical volume correspondence table 701 (S302).

Next, the file migration server 26, referring to the LDEV-storage tier correspondence table 703, obtains the storage tier information for the logical devices corresponding the logical volumes mounted in the selected directories (S303).

The file migration server 26 then stores the LDEV number obtained at S302 and the storage tier information obtained at S303 as table entries in the directory-LDEV correspondence table 704 (S304).

If any directory on which the above processing has not been performed exists (S305: YES), the file migration server 26 repeats the processing at S301 to S304, and when the above processing has been completed for all directories (S305: NO), the file migration server 26 ends the processing for preparing the table 704.

Next, file migration control between storage tiers is explained below with reference to FIGS. 15 to 18.

Figure 15:
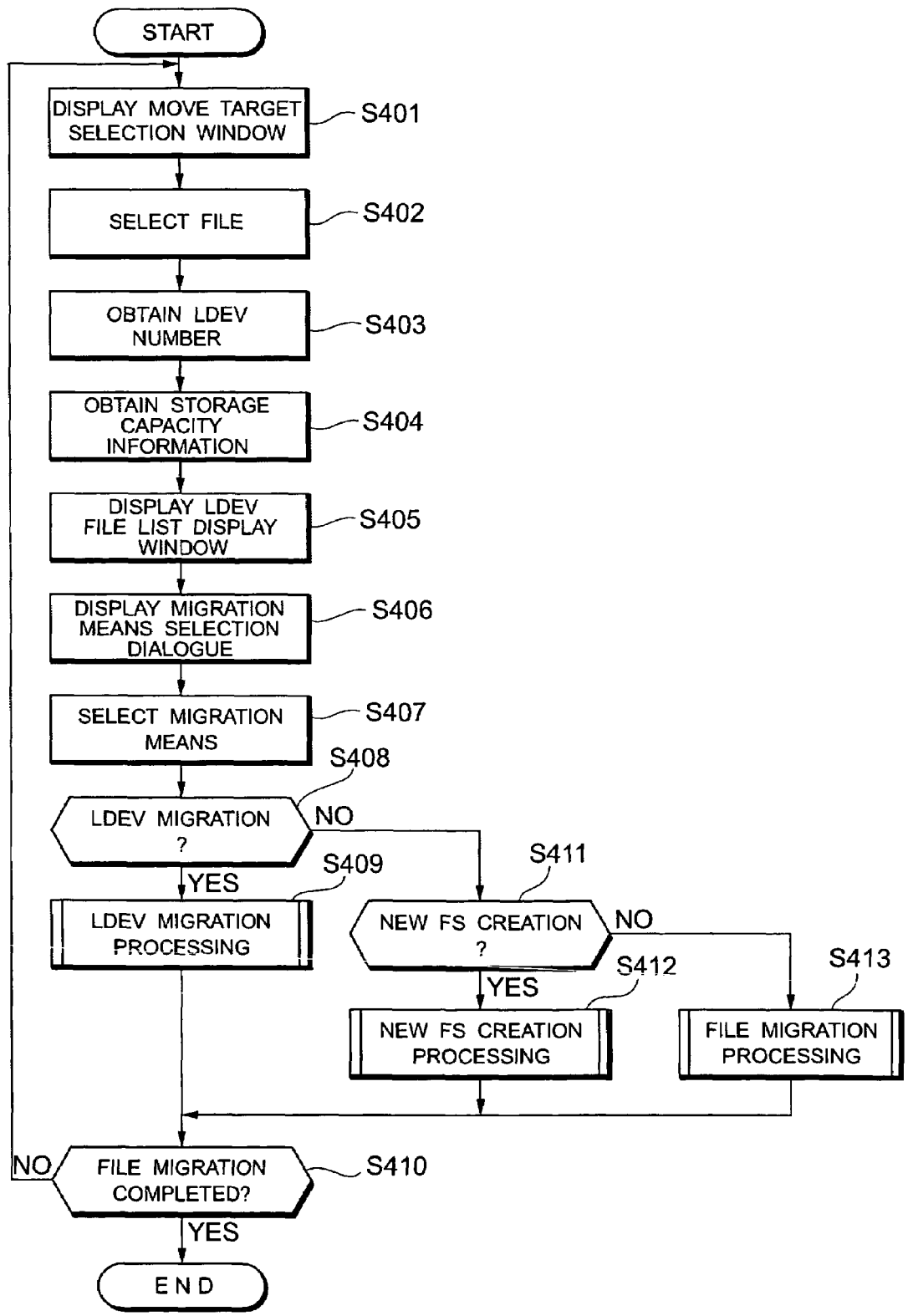
FIG. 15 shows a flowchart for processing to move a file between storage tiers.

FIG. 15 shows a flowchart for the processing to move a file between storage tiers. The file migration server 26 displays the move target selection window 801 (S401). When the administrator selects a file to be moved (S402), the file migration server 26, referring to the directory-LDEV correspondence table 704, obtains the LDEV number for the logical device in which the file selected at S402 is stored (S403).

Then the file migration server 26, referring to the LDEV-storage tier correspondence table 703, obtains the storage capacity information for the logical device corresponding to the LDEV number obtained at S403 (S404).

Next, the file migration sever 26, referring to the directory-LDEV correspondence table 704, obtains a list of directories mounted in the logical device corresponding the LDEV number obtained at S403, and displays the LDEV file list display window 807 including this directory list information, and the storage capacity information for the logical device obtained at S404 (S405).

Subsequently, the file migration server 26 displays the file migration means selection dialogue 808 (S406). When the administrator selects any of the file migration means (S407), the file migration server 26 judges whether or not the selected means is the "LDEV migration (first file migration means)" (S408). If it is the "LDEV migration" (S408: YES), the file migration server 26 performs the "LDEV migration processing" (S409).

If it is not the "LDEV migration" (S408: NO), the file migration server 26 judges whether or not it is the "new FS creation (third file migration means)" (S411). If it is the "new FS creation" (S411: YES), the file migration server 26 performs the "new FS creation processing" (S412). If it is not the "new FS creation" (S411: NO), the file migration server 26 performs the "file migration processing (second file migration means)" (S413).

If any file to be moved remains (S410: NO), the processing at S401 to S413 is repeated. If there is no file to be moved remaining (S410: YES), the file migration server 26 ends the processing.

Figure 16:
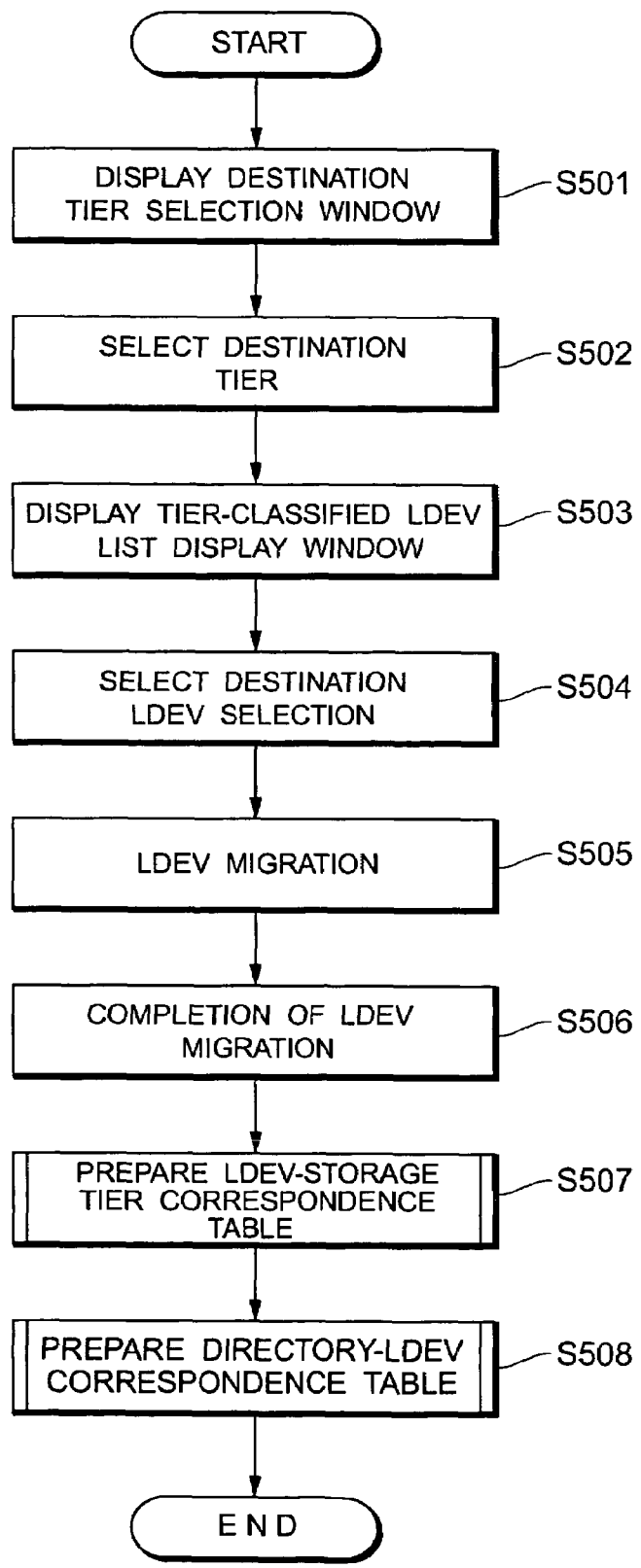
FIG. 16 shows a flowchart for LDEV migration processing.

FIG. 16 shows a flowchart for LDEV migration processing. The file migration server 26 displays the destination tier selection window 813 (S501). When the administrator selects a destination storage tier (S502), the file migration server 26, referring to the LDEV-storage tier correspondence table 703, the LDEV-logical volume correspondence table 701, and the mount table 702, displays a list of "free" logical devices belonging to the storage tier selected at S502 in the tier-classified LDEV list display window 815 (S503).

In other words, the file migration server 26, referring to the LDEV-storage tier correspondence table 703, can obtain the LDEV numbers for the logical devices belonging to the storage tier selected at S502. Also, the file migration server 26, referring to the LDEV-logical volume correspondence table 701, can obtain the logical volume corresponding to the LDEV number. Further still, the file migration server 26, referring to the mount table 702, can judge whether or not that logical volume is mounted in the file system 23. In this way, the file migration server 26 can obtain the list of "free" logical devices belonging to the storage tier selected at S502.

When the administrator selects a destination logical device via the tier-classified LDEV list display window 815 (S504), the file migration server 26, after designating the source logical device and the destination logical device, instructs the service processor 308 to perform file migration using the LDEV migration engine 31 (S505).

Then, the LDEV migration engine 31 performs the file migration, interchanging the storage tiers for the logical devices for which the file migration has been ordered from the FC tier to the SATA tier, and from the SATA tier to the FC tier.

The file migration server 26, upon receipt of notification of the completion of the file migration from the service processor 308 (S506), performs the processing for preparing the LDEV-storage tier correspondence table 703 (FIG. 13) (S507), and further performs the processing for preparing the directory-LDEV correspondence table 704 (FIG. 14) (S508), and reflects the interchange of the storage tier to which the source logical device belongs with the storage tier to which the destination logical device belongs in the LDEV-storage tier correspondence table 703, and the directory-LDEV correspondence table 704.

Figure 17:
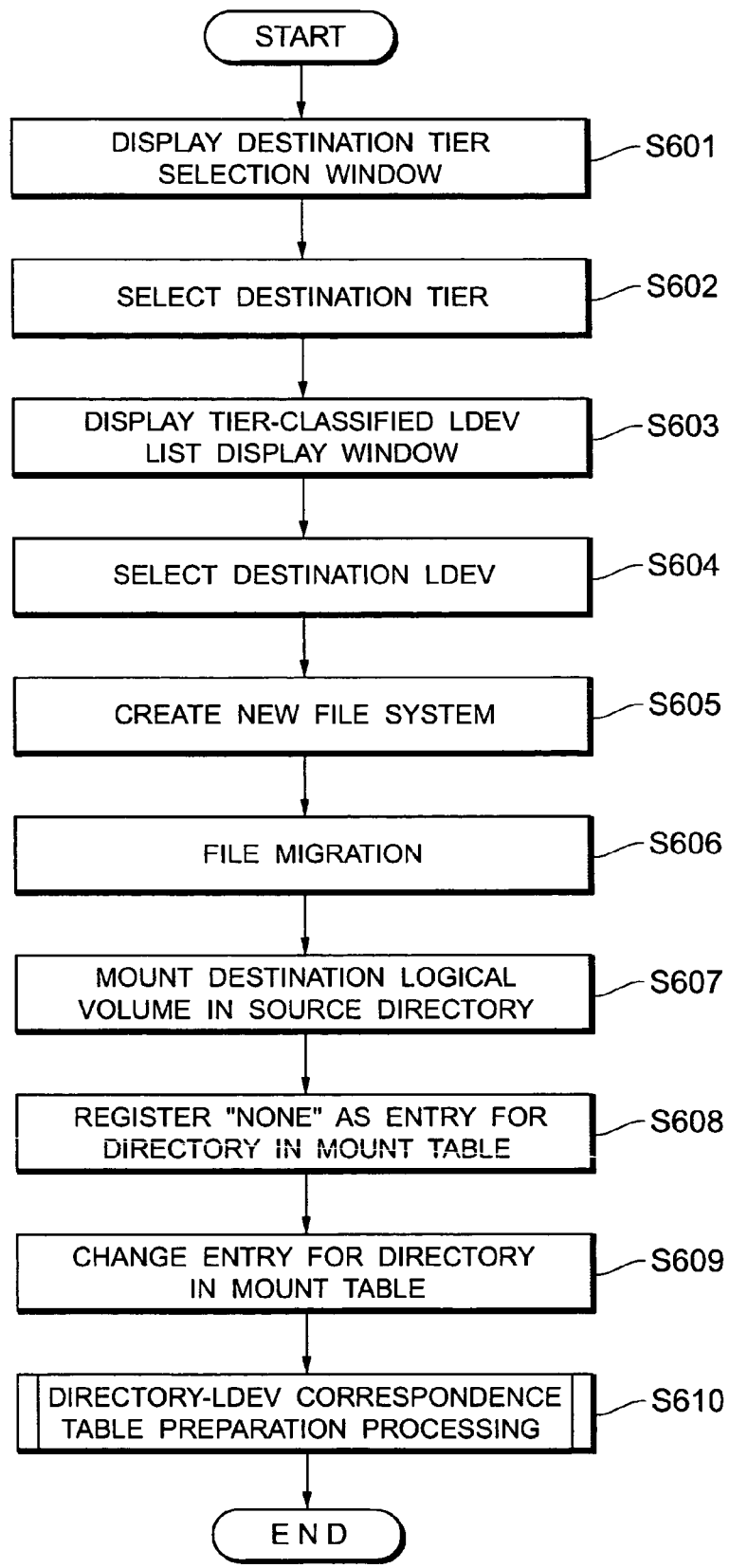
FIG. 17 shows a flowchart for new FS creation processing.

FIG. 17 shows a flowchart of the processing for new FS creation processing. The file migration server 26 displays the destination storage tier selection window 813 (S601). When the administrator selects a destination storage tier (S602), the file migration server 26, referring to the LDEV-storage tier correspondence table 703, the LDEV-logical volume correspondence table 701, and the mount table 702, displays a list of "free" logical devices belonging to the storage tier selected at S602 in the tier-classified LDEV list display window 815 (S603).

When the administrator selects a destination logical device via the tier-classified LDEV list display window 815 (S604), the file migration server 26 creates a new file system in a logical volume stored in the destination logical device (S605).

Next, the file migration server 26, using the file migration engine 25, performs file migration of the file selected at S402 to that new file system (S606).

Next, the file migration server 26 mounts the destination logical volume in the source directory (S607). Here, the start-up setting file, which is to mount the file system 23 in the directory tree when the operating system 21 is rebooted, will also be updated.

Then, if any volume that has become "free" as a result of the file migration at S606 exists, the file migration server 26 registers "NONE" as the entry for that logical volume in the mount table 702 (S608).

Next, the file migration server 26 stores the "directory for the source logical volume" as the table entry that was the "directory for the destination logical volume" in the mount table 702 (S609).

Then the file migration server 26 performs the processing for preparing the directory-LDEV correspondence table 704 (FIG. 14), and updates the table entries in the directory-LDEV correspondence table 704 (S610).

Figure 18:
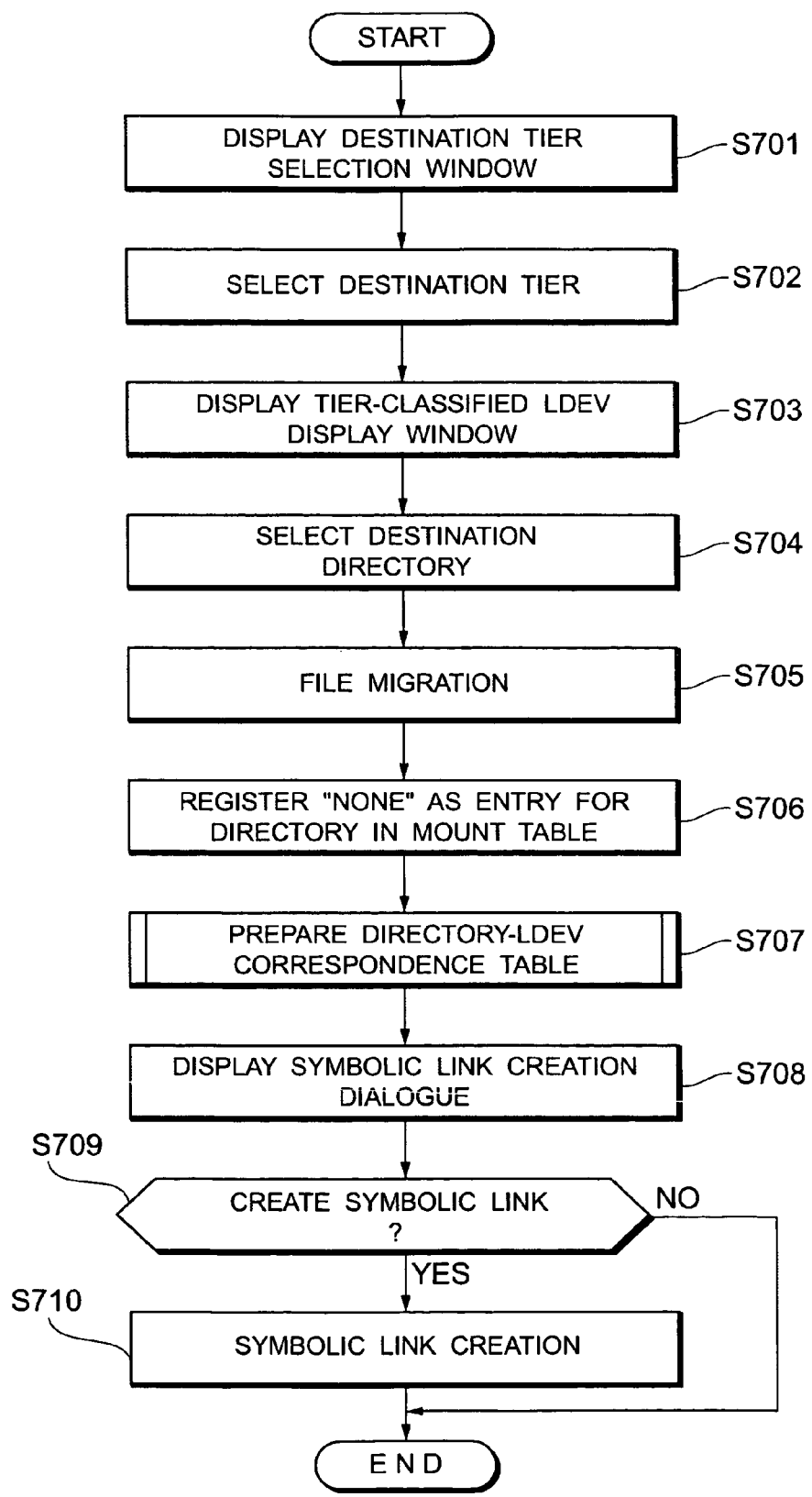
FIG. 18 shows a flowchart for file migration processing.

FIG. 18 shows a flowchart for file migration processing. The file migration server 26 displays the destination tier selection window 813 (S701). When the administrator selects a destination storage tier (S702), the file migration server 26, referring to the directory-LDEV correspondence table 704, displays in the tier-classified directory list display window 817 the directories belonging to the selected storage tier, and their subdirectories (S703).

When the administrator selects a destination directory via the tier-classified directory list display window 817 (S704), the file migration server 26 performs file migration using the file migration engine 25 (S705).

Subsequently, if any logical volume that has become "free" as a result of the file migration at S705 exists, the file migration server 26 registers "NONE" as the table entry for that logical volume in the mount table 702 (S706).

The file migration server 26 then performs the processing for preparing the directory-LDEV correspondence table 704 (FIG. 14), and updates the table entry in the directory-LDEV correspondence table 704 (S707).

Next, the file migration server 26 displays the symbolic link creation dialogue 819 (S708). If the administrator selects "YES" (S709: YES), the file migration server 26 creates a symbolic link for the source directory path for the file after the migration (S710). If the administrator selects "NO" (S709: NO), the file migration server 26 ends the processing without creating the symbolic link.

The above description refers to an example in which the file migration server 26 creates a GUI. However, the file migration client 51 may also create the GUI.

According to this embodiment, file migration is executed using the LDEV migration engine 31, making it possible to achieve filed-based file migration without involving a change in directory path. Furthermore, in addition to the LDEV migration engine 31, as the block-based first file migration means not involving a change in directory path, the file migration engine 25, as the file-based second file migration means involving a change in directory path, or the file migration engine 25, as the file-based third file migration means not involving a change in directory path, may arbitrarily be used, thereby making it possible to provide a highly-convenient file migration environment.

The file migration server 26 of this embodiment is a computer program to execute a step of displaying a GUI for guiding file migration; a step of receiving via the GUI a file migration command to migrate a part of one or more files stored in a source logical device to a destination logical device; and a step of migrating all of the files stored in the source logical device to the destination logical device without a change in directory path for any of the files. This computer program may be installed in the NAS server 26, or may also be stored on a recording medium. For the recording medium, for example, an optical recording medium (a recording medium that can optically read data, such as a CD-RAM, CD-ROM, DVD-RW, DVD-ROM, DVD-R, PD disk, MD disk, or MO disk), a magnetic recording medium (a recording medium that can magnetically read data, such as a flexible disk, magnetic card, or magnetic tape), or a memory device (a semiconductor memory device such as DRAM, or a ferroelectric memory device such FRAM) is preferable.

What is claimed is:

1. A storage system for moving files between storage tiers, comprising:
 a plurality of physical devices providing a plurality of logical devices for storing one or more files;
 a file system for managing the files stored in the logical devices with a directory tree structure;
 a file migration server for controlling migration of the files stored in the logical devices to move the files between storage tiers;
 a file migration client for displaying a GUI for guiding file migration, and conveying an administrator's file migration command to the file migration server; and
 first file migration means for migrating all of one or more files stored in a source logical device selected from the logical devices by the administrator to a destination logical device, which is a different storage tier than the storage logical device, selected from the logical devices by the administrator, without a change in directory path for any of the files;
 wherein, upon a file migration command to select and migrate the one or more files stored in the source logical device to the destination logical device being input to the file migration client via the GUI, the file migration server controlling the first file migration means to migrate the selected files stored in the source logical device to the destination logical device, by performing the steps of:
 referring to a directory-LDEV (logical device) correspondence table to obtain an LDEV number for the source logical device in which the selected files are stored;
 obtaining storage capacity information corresponding to the obtained LDEV number;
 displaying an LDEV file list display window including a list of directories mounted in the source logical device corresponding to the LDEV number and the obtained storage capacity information;
 displaying a file migration means selection dialogue for the administrator to select or not select the first file migration means; and,
 if the administrator selects the first file migration means, controlling the first file migration means to migrate the selected files stored in the source logical device to the destination logical device,
 wherein each of the physical devices is logically classified into one of a plurality of storage tiers;

wherein the GUI includes a screen for displaying, in relation to each other. the directory paths of the files and the storage tiers to which the physical devices storing the files belong;

wherein the GUI includes a screen for, subject to any storage tier from among the list of storage tiers having been selected after the selection of the first file migration means as the file migration means, displaying a list of one or more unassigned logical devices belonging to the selected storage tier which have not yet been assigned to a file migration client, said storage system further comprising:

a logical volume which has a correspondence relationship with one of the logical devices and is mounted in the directory tree structure in the file system;
an LDEV-storage tier correspondence table;
an LDEV-logical volume correspondence table; and
a logical volume-directory tree structure correspondence table,
wherein, based on the destination storage tier to which a file is migrated, the file migration server, referring to the storage tier-LDEV correspondence table, obtains a plurality of LDEV numbers, wherein the file migration server, referring to the LDEV-logical volume correspondence table, obtains the logical volumes respectively corresponding to the obtained LDEV numbers; and wherein the file migration server, referring to the logical volume-directory tree structure correspondence table, judges, as unassigned logical devices, logical devices corresponding to the logical volumes that are not mounted in the directory tree among the plurality of logical volumes obtained by the file migration server and shows to the file migration client a list of unassigned logical devices as file migration destination logical devices.

2. The storage system according to claim 1 further comprising second file migration means for executing file migration involving a change in directory path.

3. The storage system according to claim 2, wherein the GUI includes a screen for displaying a list of one or more other files stored in the logical device storing a file designated as a file move target.

4. The storage system according to claim 3 further comprising third file migration means for creating a new file system containing a file to be moved, and mounting the new file system in a source directory.

5. The storage system according to claim 4, wherein the GUI includes a screen for requesting selection of which of the first file migration means, the second file migration means, and the third file migration means is to be used for file migration.

6. The storage system according to claim 5, wherein the GUI includes a screen for, subject to any of the first file migration means, the second file migration means, and the third file migration means having been selected as the file migration means, displaying a list of one or more storage tiers to which one or more candidate destination physical devices for the file, from among the physical devices, belong.

7. The storage system according to claim 6, wherein the GUI includes a screen for, subject to any storage tier from among the list of storage tiers having been selected after the selection of the second file migration means as the file migration means, displaying a list of one or more directory paths belonging to the selected tier.

8. The storage system according to claim 2 further comprising a storage controller for controlling data input/output to/from the physical devices, and a NAS (Network Attached Storage) server for processing a file access request from a NAS client, wherein the first file migration means is a function of the storage controller, and the second file migration means is a function of the NAS server.

9. A file migration method for moving files between storage tiers of a storage system comprising a plurality of physical devices providing a plurality of logical devices for storing one or more files, a file system for managing the files stored in the logical devices with a directory tree structure, and a file migration server for controlling migration of the files stored in the logical devices to move the files between storage tiers, said file migration method comprising the steps of:

displaying a GUI in a file migration client for guiding file migration;

receiving via the GUI a file migration command to select and migrate a part of one or more files stored in a source logical device to a destination logical device which is in a different storage tier than the source logical device; and migrating the selected files stored in the source logical device to the destination logical device via a first file migration means without a change in directory path for any of the files, including the steps of:

referring to a directory-LDEV (logical device) correspondence table to obtain an LDEV number for the source logical device in which the selected files are stored;

obtaining storage capacity information corresponding to the obtained LDEV number;

displaying an LDEV file list display window including a list of directories mounted in the source logical device corresponding to the LDEV number and the obtained storage capacity information;

displaying a file migration means selection dialogue for the administrator to select or not select the first file migration means; and, if the administrator selects the first file migration means, controlling the first file migration means to migrate the selected files stored in the source logical device to the destination logical device,
wherein each of the physical devices is logically classified into one of a plurality of storage tiers;

wherein the GUI includes a screen for displaying, in relation to each other, the directory paths of the files and the storage tiers to which the physical devices storing the files belong, wherein the GUI includes a screen for, subject to any storage tier from among the list of storage tiers having been selected after the selection of the first file migration means as the file migration means, displaying a list of one or more unassigned logical devices belonging to the selected storage tier which have not yet been assigned to a file migration client, said storage system further comprising:

a logical volume which has a correspondence relationship with one of the logical devices and is mounted in the directory tree structure in the file system,
an LDEV-storage tier correspondence table;
an LDEV-logical volume correspondence table; and
a logical volume-directory tree structure correspondence table, said file migration method further comprising:

based on the destination storage tier to which a file is migrated, the file migration server, referring to the storage tier-LDEV correspondence table, obtaining a plurality of LDEV numbers, referring, via the file migration server, to the LDEV-logical volume correspondence table, to obtain the logical volumes respectively corresponding to the obtained LDEV numbers; and referring, via the file migration server, to the logical volume-directory tree structure correspondence table, to judge, as unassigned logical devices, logical devices corresponding to the logical volumes that are not mounted in the directory tree among the plurality of logical volumes obtained by the file migration server and to show to the file migration client a list of unassigned logical devices as file migration destination logical devices.

10. The file migration method according to claim 9, wherein the GUI includes a screen for displaying a list of one or more other files stored in a logical device storing a file designated as a file move target.

11. The file migration method according to claim 10, wherein the GUI includes a screen for requesting selection of which of the first file migration means for migrating all of the files stored in the source logical device to the destination logical device without a change in directory path for any of the files, second file migration means for executing file migration involving a change in directory path, and third file migration means for creating a new file system containing a file to be moved and mounting the new file system in a source directory, in order to conduct file migration.

12. The file migration method according to claim 11, wherein the GUI displays a screen for, subject to any of the first file migration means, the second file migration means, and the third file migration means having been selected as the file migration means, displaying a list of one or more storage tiers to which one or more candidate destination logical devices for the file belong.

13. The file migration method according to claim 12, wherein the GUI includes a screen for, subject to any storage tier from among the list of storage tiers having been selected after the selection of either of the first file migration means or the third file migration means as the file migration means, displaying a list of one or more "free" logical devices belonging to the selected storage tier.

14. The file migration method according to claim 12, wherein the GUI includes a screen for, subject to any storage tier from among the list of storage tiers having been selected after the selection of the second file migration means as the file migration means, displaying a list of one or more directory paths belonging to the selected tier.

15. A computer program embodied in a computer-readable medium comprising a computer program to make a storage system comprising a plurality of physical devices providing a plurality of logical devices for storing one or more files, a file system for managing the files stored in the logical devices with a directory tree structure, and a file migration server for controlling migration of the files stored in the logical devices to move the files between storage tiers, move files between storage tiers by executing the steps of:

displaying a GUI for guiding file migration;

receiving via the GUI a file migration command to select and migrate a part of one or more files stored in a source logical device to a destination logical device which is in a different storage tier than the source logical device; and migrating the selected files stored in the source logical device to the destination logical device via a first file migration means without a change in directory path for any of the migrated files, including the steps of:

referring to a directory-LDEV (logical device) correspondence table to obtain an LDEV number for the source logical device in which the selected files are stored;

obtaining storage capacity information corresponding to the obtained LDEV number;

displaying an LDEV file list display window including a list of directories mounted in the source logical device corresponding to the LDEV number and the obtained storage capacity information;

displaying a file migration means selection dialogue for the administrator to select or not select the first file migration means; and, if the administrator selects the first file migration means, controlling the first file migration means to migrate the selected files stored in the source logical device to the destination logical device, wherein each of the physical devices is logically classified into one of a plurality of storage tiers;

wherein the GUI includes a screen for displaying, in relation to each other, the directory paths of the files and the storage tiers to which the physical devices storing the files belong;

wherein the GUI includes a screen for, subject to any storage tier from among the list of storage tiers having been selected after the selection of the first file migration means as the file migration means, displaying a list of one or more unassigned logical devices belonging to the selected storage tier which have not yet been assigned to a file migration client, said storage system further comprising:

a logical volume which has a correspondence relationship with one of the logical devices and is mounted in the directory tree structure in the file system, an LDEV-storage tier correspondence table;

an LDEV-logical volume correspondence table; and a logical volume-directory tree structure correspondence table, wherein the program executes the further steps of:

based on the destination storage tier to which a file is migrated, the file migration server, referring to the storage tier-LDEV correspondence table, obtaining a plurality of LDEV numbers, referring, via the file migration server, to the LDEV-logical volume correspondence table, to obtain the logical volumes respectively corresponding to the obtained LDEV numbers; and referring, via the file migration server, to the logical volume-directory tree structure correspondence table, to judge, as unassigned logical devices, logical devices corresponding to the logical volumes that are not mounted in the directory tree among the plurality of logical volumes obtained by the file migration server and to show to the file migration client a list of unassigned logical devices as file migration destination logical devices.

* * * * *